United States Patent
Iwatsuka et al.

(10) Patent No.: US 10,591,801 B2
(45) Date of Patent: Mar. 17, 2020

(54) OPTICAL MODULATOR

(71) Applicant: TDK CORPORATION, Tokyo (JP)

(72) Inventors: Shinji Iwatsuka, Tokyo (JP); Kenji Sasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/095,116

(22) PCT Filed: Apr. 7, 2017

(86) PCT No.: PCT/JP2017/014467
§ 371 (c)(1),
(2) Date: Oct. 19, 2018

(87) PCT Pub. No.: WO2017/183484
PCT Pub. Date: Oct. 26, 2017

(65) Prior Publication Data
US 2019/0146302 A1    May 16, 2019

(30) Foreign Application Priority Data
Apr. 21, 2016 (JP) .................. 2016-085398

(51) Int. Cl.
*G02F 1/035* (2006.01)
*G02F 1/225* (2006.01)
*G02F 1/21* (2006.01)

(52) U.S. Cl.
CPC .............. *G02F 1/225* (2013.01); *G02F 1/035* (2013.01); *G02F 2001/212* (2013.01); *G02F 2202/20* (2013.01)

(58) Field of Classification Search
CPC ........ G02F 1/025; G02F 1/225; G02F 1/2255; G02F 2001/212; G02F 1/035
See application file for complete search history.

(56) References Cited

U.S. PATENT DOCUMENTS 6,400,490 B1 * 6/2002 Hosoi ..................... G02F 1/225
359/254
6,580,840 B1 * 6/2003 McBrien ............... G02F 1/0356
385/2

(Continued)

FOREIGN PATENT DOCUMENTS

JP    H11295675 A    10/1999
JP    2003202530 A    7/2003

(Continued)

*Primary Examiner* — Jennifer Doan
(74) *Attorney, Agent, or Firm* — Young Law Firm, P.C.

(57) ABSTRACT

A single drive type optical modulator has good high-frequency characteristics and reduced wavelength chirp of the modulated light. An optical modulator is provided with a Mach-Zehnder optical waveguide including first and second optical waveguides, a buffer layer covering the first and second optical waveguides, and an electrode layer including first and second ground electrodes and a signal electrode positioned between the first and second ground electrodes in a plan view. The signal electrode has a first lower surface covering the first optical waveguide through the buffer layer, the first ground electrode has a first lower surface covering the second optical waveguide through the buffer layer and a second lower surface positioned above the first lower surface, and a gap between the signal electrode and the second ground electrode that is larger than a gap between the signal electrode and the first ground electrode.

7 Claims, 9 Drawing Sheets

(56) References Cited

U.S. PATENT DOCUMENTS

| | | |
|---|---|---|
| 9,664,931 B1* | 5/2017 | Yap .................. G02F 1/2255 |
| 2005/0175271 A1 | 8/2005 | Sugiyama et al. |
| 2005/0180694 A1 | 8/2005 | Sugiyama et al. |
| 2015/0138619 A1* | 5/2015 | Iwatsuka .............. G02F 1/0316 |
| | | 359/245 |
| 2017/0052424 A1* | 2/2017 | Iwatsuka .............. G02F 1/2257 |

FOREIGN PATENT DOCUMENTS

| | | |
|---|---|---|
| JP | 2005221874 A | 8/2005 |
| JP | 2006195383 A | 7/2006 |
| JP | 3957217 A | 5/2007 |
| JP | 2014006348 A | 1/2014 |
| JP | 2015118371 A | 6/2015 |

* cited by examiner

OPTICAL MODULATOR

TECHNICAL FIELD

The present invention relates to an optical modulator used in the fields of optical communication and optical instrumentation and, more particularly, to an electrode structure of a Mach-Zehnder optical modulator.

BACKGROUND ART

As the use of the Internet spreads, the amount of data communicated is rapidly increasing, making the optical fiber communication very important. In the optical fiber communication, electric signals are converted into optical signals, and the optical signals are transmitted through optical fibers. The optical fiber communication is characterized in that the signals are transmitted in the broad band, with a small loss, and are not affected by noise.

Known as systems for converting electric signals into optical signals are the direct modulation system using a semiconductor laser and the external modulation system using optical modulators. The direct modulation system need not use the optical modulators and its running cost is low, but cannot achieve high-speed modulation. This is why the external modulation system is used in high-speed and long-distance data communication.

As the optical modulator, a Mach-Zehnder optical modulator in which an optical waveguide is formed by Ti (titanium) diffusion in the vicinity of the surface of a single-crystal lithium niobate substrate has been practically used (see, e.g., Patent Document 1). Although high-speed optical modulators having a modulation speed of 40 Gb/s or more are commercially available, they have a major drawback that the entire length thereof is as long as about 10 cm. The Mach-Zehnder optical modulator is an optical modulator that uses an optical waveguide (Mach-Zehnder optical waveguide) having a Mach-Zehnder interferometer structure. The Mach-Zehnder interferometer is a device that separates light emitted from one light source into two beams, makes the two beams pass through different paths, and then recombines the two beams to cause interference, and the Mach-Zehnder optical modulator applying the Mach-Zehnder interferometer is used for generating various modulated lights.

On the other hand, Patent Documents 2 to 4 disclose a Mach-Zehnder optical modulator using a c-axis oriented lithium niobate film. The optical modulator using the lithium niobate film achieves significant reduction in size and driving voltage as compared with the optical modulator using the lithium niobate single-crystal substrate.

As described in Patent Document 1, conventional Mach-Zehnder optical modulators have a problem of deterioration in signal waveform due to a change in wavelength of a modulated light called wavelength chirp. Electric fields to be applied to respective parallel waveguides differ from each other in strength due to a difference in arrangement of a signal electrode relative to the parallel waveguides, with the result that a variation amount ($\Delta n_s$) of the refractive index of one waveguide that is close to the signal electrode becomes larger than a variation amount ($\Delta n_G$) of the refractive index of the other waveguide that is far from the signal electrode. This makes the phase changes of lights propagating in the respective parallel waveguides differ in absolute value, so that the wavelength chirp occurs to degrade a signal waveform after transmission when a signal is changed from "0" to "1" or from "1" to "0".

The cross-sectional structure of a conventional optical modulator 600 described in Patent Document 2 is illustrated in FIG. 9A. A pair of optical waveguides 22a and 22b of a lithium niobate film are formed on a sapphire substrate 21, and a signal electrode 24a and a ground electrode 24b are disposed above the optical waveguides 22a and 22b, respectively, through a buffer layer 23. The optical modulator 600 is of a so-called single drive type having one signal electrode 24a, and the signal electrode 24a and ground electrode 24b have a symmetrical structure, so that electric fields to be applied to the optical waveguides 22a and 22b are the same in magnitude and opposite in polarity, preventing the wavelength chirp of a modulated light from occurring. However, it does not operate at high frequencies because the area of the ground electrode 24b is small.

The cross-sectional structure of a conventional optical modulator 700 described in Patent Document 3 is illustrated in FIG. 9B. Two signal electrodes 24a1 and 24a2 are disposed above a pair of optical waveguides 22a and 22b of a lithium niobate film, respectively, through a buffer layer 23, and three ground electrodes 24c 24d, and 24e are disposed so as to be separated from the signal electrodes 24a1 and 24a2. When voltages same in magnitude and opposite in polarity are applied to the two signal electrodes 24a1 and 24a2, respectively, electric fields to be applied to the optical waveguides 22a and 22b become the same in magnitude and opposite in polarity, preventing the wavelength chirp of a modulated light from occurring. Further, the amount of the chirp can be adjusted by adjusting voltage to be applied to the pair of optical waveguides 22a and 22b. Furthermore, since the areas of the left and right ground electrodes 24c and 24d are sufficiently ensured, it has a structure operable at high frequencies. However, the optical modulator 700 is of a dual drive type having two signal electrodes 24a and 24b, which complicates an electrode structure. Further, it is necessary to provide two input connectors for high-frequency electric signals and to apply voltages to both the signal electrodes while controlling the phase of the electric signal in which data has been inversed, and this complicates the circuit configuration of a drive system.

CITATION LIST

Patent Document

[Patent Document 1] Japanese Patent No. 4,485,218
[Patent Document 2] Japanese Patent Application Laid-Open No. 2006-195383
[Patent Document 3] Japanese Patent Application Laid-Open No. 2014-006348
[Patent Document 4] Japanese Patent Application Laid-Open No. 2015-118371

SUMMARY OF INVENTION

Problem to be Solved by Invention

The cross-sectional structure of an optical modulator 800 of 2 a single drive type capable of operating at high frequencies is illustrated in FIG. 9C. In the optical modulator 800, first and second ground electrodes 24b and 24c are provided to the left and right of a single signal electrode 24a, and each area of the ground electrodes is sufficiently ensured, it has a structure operable at high frequencies. However, the planar size of the ground electrode 24b is large, making it difficult for an electric field to concentrate on an optical waveguide 22b, with the result that an electric field to be applied to the optical waveguide 22a is larger in magnitude than an electric field to be applied to the optical waveguide 22b, so that the wavelength chirp of a modulated light becomes recognized as a problem.

It is therefore an object of the present invention to provide a single drive type optical modulator having good high-frequency characteristics and reduced wavelength chirp of the modulated light.

Means for Solving Problem

To solve the above problems, an optical modulator according to the present invention includes a Mach-Zehnder optical waveguide including first and second optical waveguides, a buffer layer covering the first and second optical waveguides, and an electrode layer including first and second ground electrodes and a signal electrode positioned between the first and second ground electrodes in a plan view. The signal electrode has a first lower surface covering the first optical wave guide through the buffer layer. The first ground electrode has a first lower surface covering the second optical waveguide through the buffer layer and a second lower surface positioned above the first lower surface thereof. A gap between the signal electrode and the second ground electrode is larger than a gap between the signal electrode and the first ground electrode.

According to the present invention, a difference between the magnitudes of electric fields to be applied respectively to the pair of optical waveguides caused due to a difference in size between the signal electrode and the first ground electrode is minimized, whereby the wavelength chirp of the modulated light can be reduced. Further, existence of the second ground electrode allows a reduction in radiation loss to thereby obtain good high-frequency characteristics. Further, making the gap between the signal electrode and the second ground electrode larger than the gap between the signal electrode and the first ground electrode allows a reduction in the difference between the magnitudes of electric fields to be applied respectively to the pair of optical waveguides caused due to influence of the second ground electrode to thereby reduce the wavelength chirp of the modulated light.

In the present invention, a width of the first lower surface of the signal electrode is preferably larger than a width of the first lower surface of the first ground electrode. This allows a further reduction in the difference between the magnitudes of electric fields to be applied respectively to the pair of optical waveguides caused due to influence of the second ground electrode to thereby reduce the wavelength chirp of the modulated light.

In the present invention, the signal electrode preferably further has a second lower surface positioned above the first lower surface thereof. This allows an electric field to be concentrated on the first optical waveguide and allows achievement of balance between the electric fields to be applied respectively to the first and second optical waveguides.

In the present invention, the width of the first lower surface of the signal electrode and the width of the first lower surface of the first ground electrode are preferably larger than the widths of the first and second optical waveguides. This allows the signal electrode and the first ground electrode to reliably face the first and second optical waveguides, respectively, while enhancing concentration of an electric field on the pair of optical waveguides.

It is preferable that the optical modulator according to the present invention further includes an insulating layer provided between the buffer layer and the electrode layer, the insulating layer has first and second openings positioned above the first and second optical waveguides, respectively, the signal electrode includes an upper part formed in the electrode layer and a lower part embedded in the first opening, the first ground electrode includes an upper part formed in the electrode layer and a lower part embedded in the second opening, and the width of the upper part of the first ground electrode is larger than the width of the lower part of the first ground electrode. This allows an electrode structure having first and second lower surfaces different in height to be easily achieved.

In the present invention, the width of the upper part of the signal electrode is preferably larger than the width of the lower part of the signal electrode and is also preferably equal thereto. In either case, it is possible to provide a single drive type optical modulator having good high-frequency characteristics and reduced wavelength chirp of the modulated light.

In the present invention, at least a part of the insulating layer existing at the lower portion of an electrode isolation region between the lower part of the signal electrode and the lower part of the first ground electrode may be removed. Further, a part of the buffer layer existing below the electrode isolation region may be removed together with the part of the insulating layer. Further, the optical modulator according to the present invention may further include a waveguide layer having ridges constituting the first and second optical waveguides, respectively, and a protective layer covering the upper surface of the waveguide layer excluding portions where the ridges are formed. The buffer layer may cover the upper surfaces of the respective ridges and the upper surface of the protective layer. A part of the protective layer existing below the electrode isolation region may be removed together with the part of the insulating layer and part of the buffer layer. With the above configuration, it is possible to match the effective refractive index of a traveling-wave electrode and the effective refractive index of light to achieve good speed matching, whereby an optical modulator having good high-frequency characteristics can be achieved.

In the present invention, it is preferable that the Mach-Zehnder optical waveguide has at least one linear section and at least one curved section, the first lower surface of the signal electrode covers the first optical waveguide at the linear section through the buffer layer, and the first lower surface of the first ground electrode covers the second optical waveguide at the linear section through the buffer layer. In this case, it is preferable that the linear sections includes first to third linear sections arranged in parallel to one another, the curved sections includes a first curved section connecting the first and second linear sections and a second curved section connecting the second and third linear sections, the first lower surface of the signal electrode covers the first optical waveguide at least one of the first to third linear sections through the buffer layer, and the first lower surface of the first ground electrode covers the second optical waveguide at least one of the first to third linear sections through the buffer layer. With the above configuration, the optical waveguide can have a folding structure to reduce an element length. Particularly, an optical waveguide formed of the lithium niobate film has small loss even when the curvature radius thereof is reduced up to about 50 μm, so that effects of the present invention are remarkable.

In the present invention, it is preferable that the Mach-Zehnder optical waveguide is formed of a lithium niobate film formed on a substrate, and the c-axis of the lithium niobate film is oriented in a direction perpendicular to a main surface of the substrate. When the Mach-Zehnder optical waveguide is formed using the lithium niobate film, the optical waveguide can be made very thin and narrow in line width, whereby a small-sized and high-quality optical modulator can be obtained. However, since the optical waveguide is thin and narrow in line width, a problem of the electric field concentration is conspicuous. However, according to the present invention, such a problem can be solved, and a single drive type optical modulator having good high-frequency characteristics and reduced wavelength chirp of the modulated light can be achieved.

Advantageous Effects of Invention

According to the present invention, there can be provided a single drive type optical modulator having good high-frequency characteristics and reduced wavelength chirp of the modulated light.

BRIEF DESCRIPTION OF DRAWINGS

FIGS. 1A and 1B are plan views of an optical modulator 100 according to a first embodiment of the present invention, wherein FIG. 1A illustrates only optical waveguides, and FIG. 1B illustrates the entire of the optical modulator 100 including a traveling-wave electrode.

FIG. 5A illustrates only the optical waveguide, and FIG. 5B illustrates the entire configuration of the optical modulator 500 including the traveling-wave electrode.

FIGS. 6A and 6B each illustrate an equipotential surface which is an example of a result obtained by the simulations, wherein FIG. 6A illustrates a result when T is set to 0 μm, and FIG. 6B illustrates a result when T is set to 6 μm.

MODE FOR CARRYING OUT THE INVENTION

Preferred embodiment of the present invention will be described in detail below with reference to the accompanying drawings.

Figure 1A:
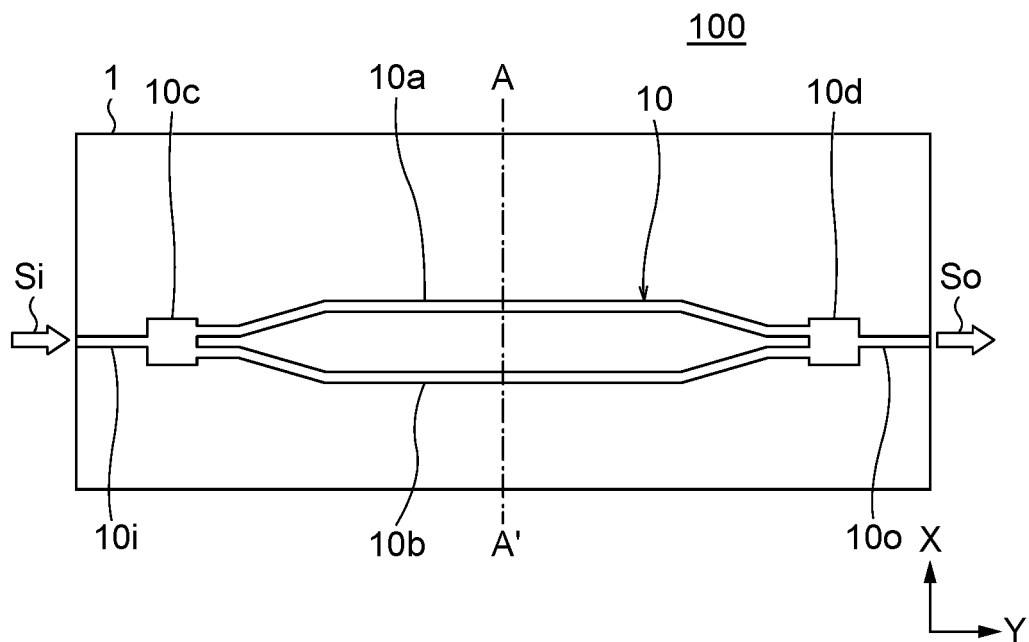
Figure 1B:
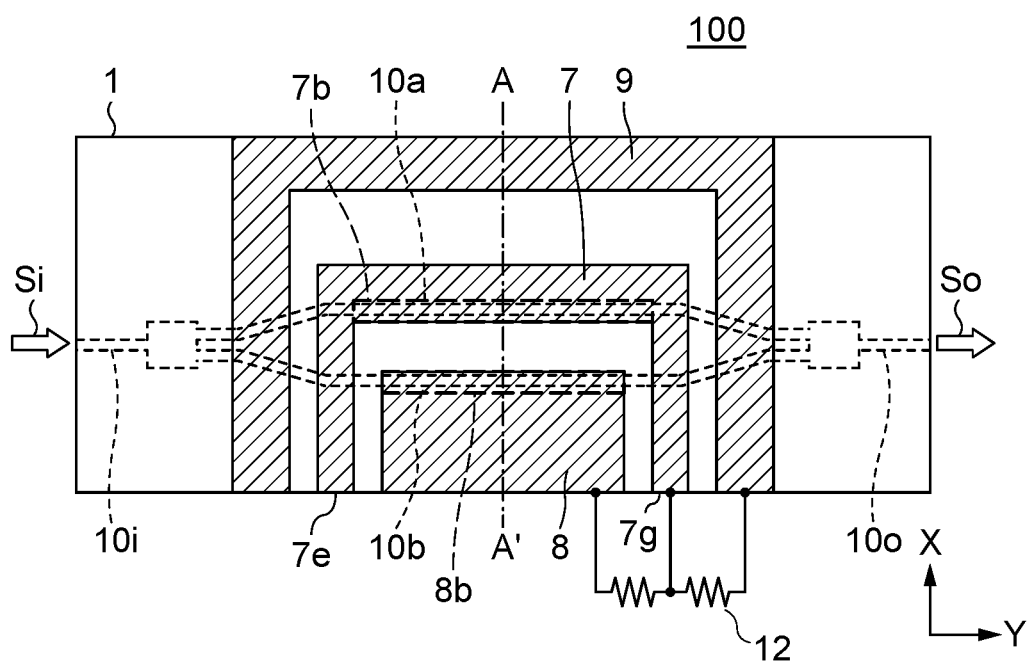

FIGS. 1A and 1B are plan views of an optical modulator 100 according to a first embodiment of the present invention. FIG. 1A illustrates only optical waveguides, and FIG. 1B illustrates the entire of the optical modulator 100 including a traveling-wave electrode.

As illustrated in FIGS. 1A and 1B, the optical modulator 100 includes a Mach-Zehnder optical waveguide 10 formed on a substrate 1 and having first and second optical waveguides 10a and 10b provided in parallel to each other, a signal electrode 7 provided along the first optical waveguide 10a, a first ground electrode 8 provided along the second optical waveguide 10b, and a second ground electrode 9 provided on the side opposite to the first ground electrode 8 as viewed from the signal electrode 7.

The Mach-Zehnder optical waveguide 10 is an optical waveguide having a Mach-Zehnder interferometer structure. The Mach-Zehnder optical waveguide 10 has the first and second optical waveguides 10a and 10b which are branched from a single input optical waveguide 10i at a branch section 10c, and the first and second optical waveguides 10a and 10b are combined into a single output optical waveguide 10o at a multiplexing section 10d. An input light Si is branched at the branch section 10c. The branched lights travel through the first and second optical waveguides 10a and 10b and then multiplexed at the multiplexing section 10d. The multiplexed light is output from the output optical waveguide 10o as a modulated light So.

The signal electrode 7 is positioned between the first and second ground electrodes 8 and 9 in a plan view. One end 7e of the signal electrode 7 serves as a signal input end, and the other end 7g thereof is connected to the first and second ground electrodes 8 and 9 through terminal resistors 12. As a result, the signal electrode 7 and first and second ground electrodes 8 and 9 function as a coplanar traveling-wave electrode. Although details will be described later, the signal electrodes 7 and the first ground electrode 8 each have a two-layer structure. A lower part 7b of the signal electrode 7 denoted by the dashed line overlaps the first optical waveguide 10a in a plan view, and a lower part 8b of the first ground electrode 8 denoted by the dashed line overlaps the second optical waveguide 10b in a plan view.

An electric signal (modulated signal) is input to the one end 7e of the signal electrode 7. The first and second optical waveguides 10a and 10b are made of a material, such as lithium niobate having electrooptic effect, so that the refractive indices of the first and second optical waveguides 10a and 10b are changed with +Δn and −Δn by an electric field applied to the first and second optical waveguides 10a and 10b, with the result that a phase difference between the pair of optical waveguides changes. A signal light modulated by the change in the phase difference is output from the output optical waveguide 10o.

As described above, the optical modulator 100 according to the present embodiment is of a single drive type having one signal electrode 7, so that a sufficient area for the first ground electrode 8 can be ensured, allowing operation at high frequencies. Further, by disposing the second ground electrode 9 on the side opposite to the first ground electrode 8 across the signal electrode 7, radiation loss can be reduced, whereby better high-frequency characteristics can be obtained.

Figure 2:
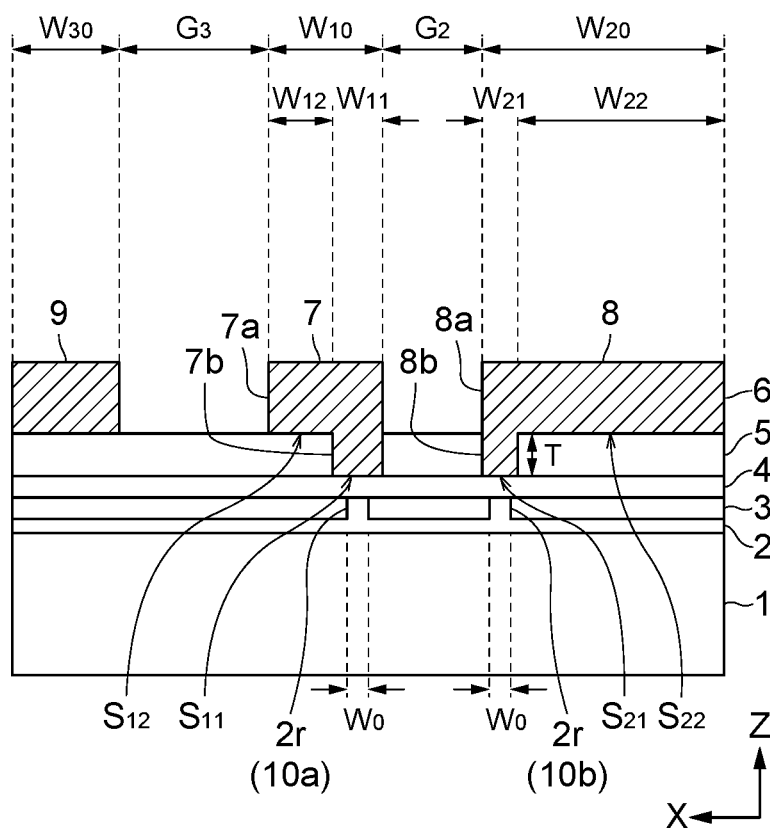
FIG. 2 is a schematic cross-sectional view of the optical modulator 100 taken along line A-A' of FIGS. 1A and 1B.

FIG. 2 is a schematic cross-sectional view of the optical modulator 100 taken along line A-A' of FIGS. 1A and 1B.

As illustrated in FIG. 2, the optical modulator 100 according to the present embodiment has a multilayer structure including a substrate 1, a waveguide layer 2, a protective layer 3, a buffer layer 4, an insulating layer 5, and an electrode layer 6 which are laminated in this order. The substrate 1 is, e.g., a sapphire substrate, and the waveguide layer 2 made of a lithium niobate film is formed on the surface of the substrate 1. The waveguide layer 2 has the first and second optical waveguides 10a and 10b each formed by a ridge 2r. A width $W_0$ of each of the first and second optical waveguides 10a and 10b can be set to, e.g., 1 μm.

The protective layer 3 is formed in an area not overlapped with the first and second optical waveguides 10a and 10b in a plan view. The protective layer 3 covers the entire area of the upper surface of the waveguide layer 2 excluding areas where the ridges 2r are formed, and the side surfaces of the ridges 2r are also covered with the protective layer 3, so that scattering loss due to the roughness of the side surfaces of the ridges 2r can be prevented. The thickness of the protective layer 3 is substantially equal to the height of the ridge 2r of the waveguide layer 2. The material of the protective layer 3 is not particularly limited, but silicon oxide ($SiO_2$), for example, can be used.

The buffer layer 4 is formed on the upper surfaces of the ridges 2r of the waveguide layer 2 so as to prevent light propagating through the first and second optical waveguides 10a and 10b from being absorbed by the signal electrode 7 or first ground electrode 8. As the buffer layer 4, a material, such as silicon oxide ($SiO_2$) or aluminum oxide ($Al_2O_3$), having a lower refractive index than the waveguide layer 2 may be used, and the thickness thereof may be about 0.2 μm to 1 μm. In the present embodiment, although the buffer layer 4 covers not only the upper surfaces of the respective first and second optical waveguides 10a and 10b, but also the entire underlying surface including the upper surface of the protective layer 3, it may be patterned so as to selectively cover only the vicinity of the upper surfaces of the first and second optical waveguides 10a and 10b.

The insulating layer 5 is provided to form a level difference on the lower surface of the traveling-wave electrode. Openings (slits) are formed in respective areas of the insulating layer 5 overlapping the respective first and second optical waveguides 10a and 10b to expose the upper surface of the buffer layer 4 therethrough. A part of the electrode layer 6 is embedded in the openings, with the result that the level differences are formed on the lower surfaces of the signal electrode 7 and the first ground electrode 8, respectively. A thickness T of the insulating layer 5 is preferably equal to or larger than 1 μm. When the thickness of the insulating layer 5 is equal to or larger than 1 μm, an effect of the formation of the level difference on the lower surfaces of the respective signal electrode 7 and first ground electrode 8 can be obtained.

The electrode layer 6 is provided with the signal electrode 7, first ground electrode 8, and second ground electrode 9. The signal electrode 7 is provided overlapping the ridge 2r corresponding to the first optical waveguide 10a so as to modulate light traveling inside the first optical waveguide 10a and opposed to the first optical waveguide 10a through the buffer layer 4. The first ground electrode 8 is provided overlapping the ridge 2r corresponding to the second optical waveguide 10b so as to modulate light traveling inside the second optical waveguide 10b and opposed to the second optical waveguide 10b through the buffer layer 4. The second ground electrode 9 is provided on the side opposite to the first ground electrode 8 across the signal electrode 7.

Although the waveguide layer 2 is not particularly limited as long as it is an electrooptic material, it is preferably made of lithium niobate ($LiNbO_3$). This is because lithium niobate has a large electrooptic constant and is thus suitable as the constituent material of an optical device such as an optical modulator. Hereinafter, the configuration of the present invention when the waveguide layer 2 is made of lithium niobate will be described in detail.

Although the substrate 1 is not particularly limited in material as long as it has a lower refractive index than the lithium niobate film, the substrate 1 is preferably a substrate on which the lithium niobate film can be formed as an epitaxial film. Specifically, the substrate 1 is preferably a sapphire single-crystal substrate or a silicon single-crystal substrate. The crystal orientation of the single-crystal substrate is not particularly limited. The lithium niobate film can be easily formed as a c-axis oriented epitaxial film on single-crystal substrates of various crystal orientations. Since the c-axis oriented lithium niobate film has three-fold symmetry, the underlying single-crystal substrate preferably has the same symmetry. Thus, it is preferable that the substrate has c-plane if it is a sapphire single-crystal substrate, or (111) plane if it is a silicon single-crystal substrate.

The term "epitaxial film", as used herein, refers to a film having the crystal orientation of the underlying substrate or film. The crystal of an epitaxial film is uniformly oriented along the X-axis and Y-axis on the film surface and along the Z-axis in the thickness direction. For example, the existence of an epitaxial film can be confirmed by first measuring the peak intensity at the orientation position by 2θ-θ X-ray diffraction and secondly observing poles.

Specifically, first, in the 2θ-θ X-ray diffraction measurement, all the peak intensities except for the target plane must be 10% or less, preferably 5% or less, of the maximum peak intensity on the target plane. For example, in a c-axis oriented epitaxial lithium niobate film, the peak intensities except for a (00L) plane are 10% or less, preferably 5% or less, of the maximum peak intensity on the (00L) plane. (00L) is a general term for (001), (002), and other equivalent planes.

Secondly, poles must be observed in the measurement. Under the condition where the peak intensities are measured at the first orientation position, only the orientation in a single direction is proved. Even if the first condition is satisfied, in the case of nonuniformity in the in-plane crystalline orientation, the X-ray intensity is not increased at a particular angle, and poles cannot be observed. Since $LiNbO_3$ has a trigonal crystal system, single-crystal $LiNbO_3$ (014) has 3 poles. For the lithium niobate film, it is known that crystals rotated by 180° about the c-axis are epitaxially grown in a symmetrically-coupled twin crystal state. In this case, three poles are symmetrically-coupled to form six poles. When the lithium niobate film is formed on a single-crystal silicon substrate having a (100) plane, the substrate has four-fold symmetry, and 4×3=12 poles are observed. In the present invention, the lithium niobate film epitaxially grown in the twin crystal state is also considered to be an epitaxial film.

The lithium niobate film has a composition of $Li_xNb_AA_yO_z$. A denotes an element other than Li, Nb, and O. The number x ranges from 0.5 to 1.2, preferably 0.9 to 1.05. The number y ranges from 0 to 0.5. The number z ranges from 1.5 to 4, preferably 2.5 to 3.5. Examples of the element A include K, Na, Rb, Cs, Be, Mg, Ca, Sr, Ba, Ti, Zr, Hf, V, Cr, Mo, W, Fe, Co, Ni, Zn, Sc, and Ce, alone or in combination.

The lithium niobate film preferably has a thickness of equal to or smaller than 2 μm. This is because a high-quality lithium niobate film having a thickness larger than 2 μm is difficult to form. The lithium niobate film having an excessively small thickness cannot completely confine light, allowing light to leak to the substrate or the buffer layer and thus to be guided therethrough. Application of an electric field to the lithium niobate film may therefore cause a small change in the effective refractive index of the optical waveguides (1a and 1b). Thus, the lithium niobate film preferably has a thickness that is at least approximately one-tenth of the wavelength of light to be used.

It is desirable to form the lithium niobate film by a film forming method such as sputtering, CVD, or sol-gel process.

If the c-axis of the lithium niobate film is oriented perpendicular to the main surface of the single-crystal substrate, an electric field is applied parallel to the c-axis, thereby changing the optical refractive index in proportion to the intensity of the electric field. If the single-crystal substrate is sapphire, the lithium niobate film is formed by epitaxial growth directly on the sapphire single-crystal substrate. If the single-crystal substrate is silicon, the lithium niobate film is formed by epitaxial growth on a cladding layer (not shown) formed on the substrate. The cladding layer (not shown) is made of material which has a lower refractive index than the lithium niobate film and should be suitable for epitaxial growth. For example, if the cladding layer (not shown) is made of $Y_2O_3$, a lithium niobate film of high quality can be formed.

As a formation method for the lithium niobate film, there is known a method of thinly polishing or slicing the lithium niobate single crystal substrate. This method is advantageous in that the same characteristics as the single crystal can be obtained and can be applied to the present invention.

The signal electrode 7 has a two-layer structure and has an upper part 7a formed in the electrode layer 6 and a lower part 7b embedded in an opening (first opening) penetrating the insulating layer 5. The lower part 7b of the signal electrode 7 is positioned at the end portion of the upper part 7a of the signal electrode 7 close to the first ground electrode 8. Accordingly, a lower surface (first lower surface) $S_{11}$ of the lower part 7b of the signal electrode 7 is positioned closer to the first ground electrode 8 than a lower surface (second lower surface) $S_{12}$ of the upper part 7a. With this configuration, the first lower surface $S_{11}$ of the signal electrode 7 is in contact with the upper surface of the buffer layer 4 above the first optical waveguide 10a to cover the first optical waveguide 10a through the buffer layer 4. The second lower surface $S_{12}$ of the signal electrode 7 is positioned above the first lower surface $S_{11}$ and is not in contact with the buffer layer 4.

A width $W_{11}$ of the lower part 7b of the signal electrode 7 in the X-direction (i.e., width of the first lower surface $S_{11}$) is smaller than a width $W_{10}$ of the upper part 7a in the X-direction (i.e., entire width of the signal electrode 7). The lower part 7b is formed only near an area that overlaps the first optical waveguide 10a in a plan view and is not formed in the other area. Thus, the width $W_{11}$ of the first lower surface Sn of the signal electrode 7 is slightly larger than a width $W_0$ of the first optical waveguide 10a. To concentrate an electric field on the first optical waveguide 10a, the width $W_{11}$ of the first lower surface $S_{11}$ of the signal electrode 7 is preferably 1.1 times to 5 times, more preferably, 1.5 times to 3 times the width $W_0$ of the optical waveguide 10a.

The first ground electrode 8 also has a two-layer structure and has an upper part 8a formed in the electrode layer 6 and a lower part 8b embedded in an opening (second opening) penetrating the insulating layer 5. The lower part 8b of the first ground electrode 8 is positioned at the end portion of the upper part 8a of the first ground electrode 8 close to the signal electrode 7. Accordingly, a lower surface (first lower surface) $S_{21}$ of the lower part 8b of the first ground electrode 8 is positioned closer to the signal electrode 7 than a lower surface (second lower surface) $S_{22}$ of the upper part 8a. With this configuration, the first lower surface $S_{21}$ of the first ground electrode 8 is in contact with the upper surface of the buffer layer 4 above the second optical waveguide 10b to cover the second optical waveguide 10b through the buffer layer 4. The second lower surface $S_{22}$ of the first ground electrode 8 is positioned above the first lower surface $S_{21}$ and is not in contact with the buffer layer 4.

A width $W_{21}$ of the lower part 8b of the first ground electrode 8 in the X-direction (i.e., width of the first lower surface $S_{21}$) is smaller than a width $W_{20}$ of the upper part 8a in the X-direction (i.e., entire width of the first ground electrode 8). The lower part 8b of the first ground electrode 8 is formed only near an area that overlaps the second optical waveguide 10b in a plan view and is not formed in the other area. Thus, the width $W_{21}$ of the first lower surface $S_{21}$ of the first ground electrode 8 is slightly larger than a width $W_0$ of the second optical waveguide 10b. Accordingly, the width $W_{21}$ of the lower part 8b of the first ground electrode 8 in the X-direction is smaller than the width $W_{22}$ of the upper part 8a in the X-direction. To concentrate an electric field on the second optical waveguide 10b, the width $W_{21}$ of the first lower surface $S_{21}$ of the first ground electrode 8 is preferably 1.1 times to 5 times, more preferably, 1.5 times to 3 times the width $W_0$ of the optical waveguide 10b.

The second ground electrode 9 is positioned on the side opposite to the first ground electrode 8 across the signal electrode 7. The second ground electrode 9 has a single layer structure constituted of only a conductor provided in the electrode layer 6; however, it may have a two-layer structure like the signal electrode 7 and the first ground electrode 8.

The width $W_{20}$ of the upper part 8a of the first ground electrode 8 is larger than the width $W_{10}$ of the upper part 7a of the signal electrode 7. Further, a width $W_{30}$ of the second ground electrode 9 is also preferably larger than the width $W_{10}$ of the upper part 7a of the signal electrode 7. By setting each size of the first and second ground electrodes 8 and 9 larger than the size of the signal electrode 7, radiation loss can be reduced to thereby obtain good high-frequency characteristics.

In the cross-sectional structure of FIG. 2 obtained by vertically cutting the first and second optical waveguides 10a and 10b, a gap $G_3$ between the signal electrode 7 and the second ground electrode 9 is set larger than a gap $G_2$ between the signal electrode 7 and the first ground electrode 8. The gap between the signal electrode and the ground electrode refers to the shortest distance therebetween in the X-direction. When the gap $G_3$ between the signal electrode 7 and the second ground electrode 9 is smaller than the gap $G_2$ between the signal electrode 7 and the first ground electrode 8, a difference between the magnitudes of electric fields to be applied respectively to the pair of optical waveguides becomes large under the influence of the second ground electrode 9, causing the wavelength chirp; however, when the gap $G_3$ between the signal electrode 7 and the second ground electrode 9 is set larger than the gap $G_2$ between the signal electrode 7 and the first ground electrode 8, the influence that the second ground electrode 9 has on the electric fields to be applied respectively to the pair of optical waveguides can be reduced. This can make the magnitudes of the electric fields to be applied respectively to the pair of optical waveguides as equal as possible to thereby reduce the wavelength chirp.

In the present embodiment, the width $W_{11}$ of the lower surface $S_{11}$ of the signal electrode 7 is preferably larger than the width $W_{21}$ of the lower surface $S_{21}$ of the first ground electrode 8 ($W_{11}>W_{21}$). When the second ground electrode 9 is disposed adjacent to the signal electrode 7 as described above, radiation loss is reduced to thereby obtain good high-frequency characteristics; however, the electrode structure becomes asymmetric, causing the wavelength chirp. When the second ground electrode 9 is absent, by making the width $W_{11}$ of the lower part 7b of the signal electrode 7 and the width $W_{21}$ of the lower part 8b of the first ground electrode 8 equal to each other ($W_{11}=W_{12}$), the magnitudes of electric fields to be applied respectively to the pair of optical waveguides can be made substantially the equal; however, only by making $W_{11}$ and $W_{21}$ equal to each other when the second ground electrode 9 is disposed adjacent to the signal electrode 7, the magnitudes of electric fields to be applied respectively to the first and second optical waveguides 10a and 10b cannot be made substantially equal. However, when $W_{11}$ is set larger than $W_{12}$ as described above, the influence of the second ground electrode 9 can be reduced to allow the magnitudes of electric fields to be applied respectively to the pair of optical waveguides to be made substantially equal, whereby the wavelength chirp can be prevented from occurring.

As described above, in the optical modulator 100 according to the present embodiment, the widths $W_{20}$ and $W_{30}$ of the respective first and second ground electrodes 8 and 9 are larger than the width $W_{10}$ of the signal electrode 7, so that radiation loss can be reduced to thereby obtain good high-frequency characteristics. Further, the first ground electrode 8 is formed into a two-layer structure, and the width $W_{21}$ of the first lower surface $S_{21}$ of the lower part 8b is smaller than the width $W_{22}$ of the upper part 8a, so that an electric field can be concentrated on the second optical waveguide 10b, which makes a difference between the magnitudes of electric fields to be applied respectively to the pair of optical waveguides small to thereby reduce the wavelength chirp of a modulated light. Furthermore, the width $W_{11}$ of the lower surface $S_{11}$ of the signal electrode 7 is larger than the width $W_{21}$ of the lower part 8b of the first ground electrode 8, and the gap $G_3$ between the signal electrode 7 and the second ground electrode 9 is larger than the gap $G_2$ between the signal electrode 7 and the first ground electrode 8, so that the difference between the magnitudes of electric fields to be applied respectively to the pair of optical waveguides caused under the influence of the second ground electrode can be further reduced to thereby further reduce the wavelength chirp of a modulated light.

Figure 3:
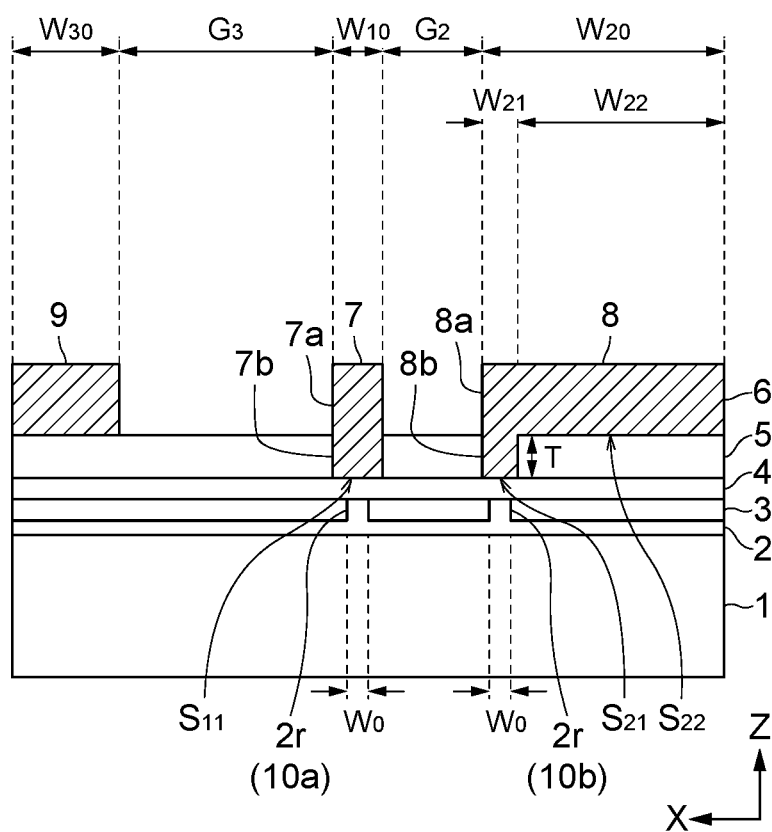
FIG. 3 is a schematic cross-sectional view illustrating the configuration of an optical modulator 200 according to a second embodiment of the present invention.

FIG. 3 is a schematic cross-sectional view illustrating the configuration of an optical modulator 200 according to a second embodiment of the present invention.

As illustrated in FIG. 3, the optical modulator 200 according to the present embodiment is featured in that the upper and lower parts 7a and 7b of the signal electrode 7 have the same width $W_{10}$ larger than the width $W_{21}$ of the lower part 8b of the first ground electrode 8 ($W_{10}$>$W_{21}$). Other configurations of the optical modulator 200 are the same as those of the optical modulator 100 according to the first embodiment. Thus, the present embodiment can produce the same effects as in the first embodiment.

In the optical modulator 100 according to the first embodiment illustrated in FIG. 2, the protective layer 3, buffer layer 4, and insulating layer 5 are each formed on the entire surface excluding the ridges 2r, the lower part 7b of the signal electrode 7, and the lower part 8b of the first ground electrode 8; however, the parts of the protective layer 3, buffer layer 4 and insulating layer 5 between the signal electrode 7 and the first ground electrode 8 may be removed.

Figure 4A:
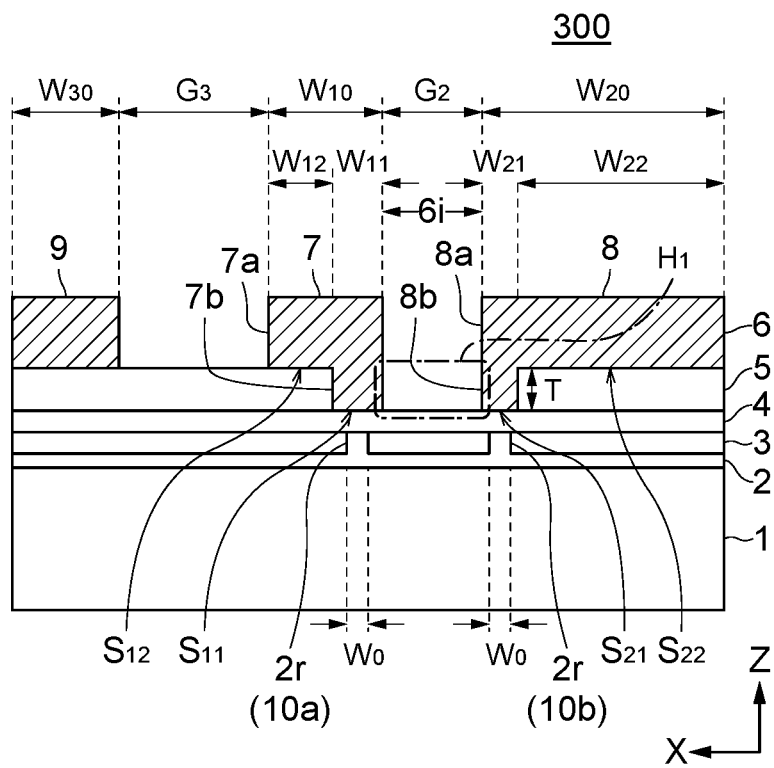
FIG. 4A is a schematic cross-sectional view illustrating the configuration of an optical modulator 300 according to a third embodiment of the present invention.
Figure 4B:
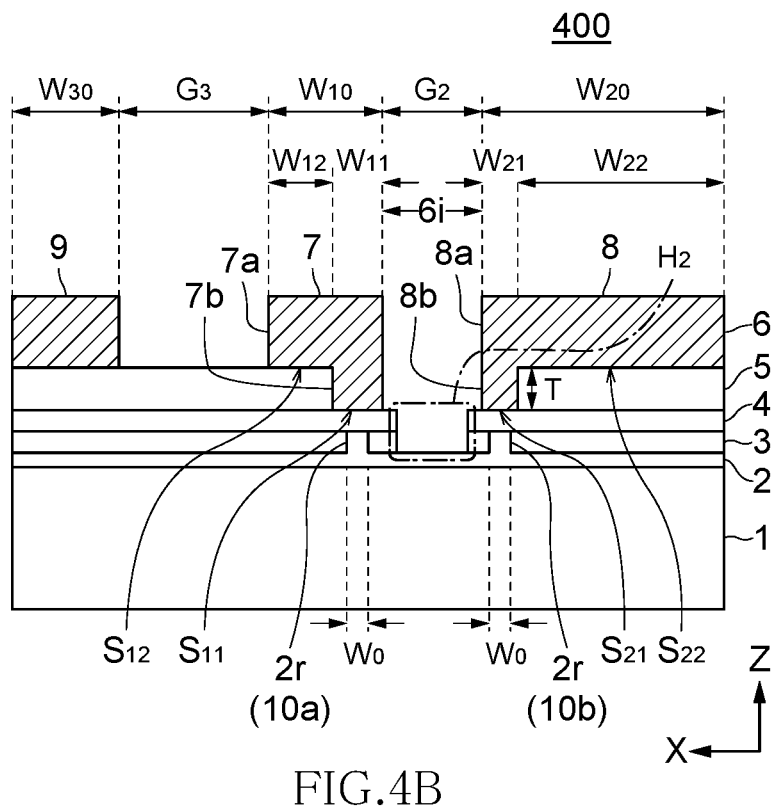
FIG. 4B is a schematic cross-sectional view illustrating the configuration of an optical modulator 400 according to a fourth embodiment of the present invention.

FIG. 4A is a schematic cross-sectional view illustrating the configuration of an optical modulator 300 according to a third embodiment of the present invention, and FIG. 4B is a schematic cross-sectional view illustrating the configuration of an optical modulator 400 according to a fourth embodiment of the present invention.

The optical modulator 300 illustrated in FIG. 4A is a first modification of the optical modulator 100 illustrated in FIG. 2 and is featured in that a part (part surrounded by the dashed line $H_1$) of the insulating layer 5 existing below an electrode isolation region 6i between the lower part 7b of the signal electrode 7 and the lower part 8b of the first ground electrode 8 is removed to expose a part of the upper surface of the buffer layer 4. The insulating layer 5 may be removed partially, not completely, from the electrode isolation region 6i.

The optical modulator 400 illustrated in FIG. 4B is a second modification of the optical modulator 100 illustrated in FIG. 2 and is featured in that not only a part of the insulating layer 5 existing below the electrode isolation region 6i between the lower part 7b of the signal electrode 7 and the lower part 8b of the first ground electrode 8, but also a part (part surrounded by the dashed line $H_2$) of a laminated body constituted of the buffer layer 4 and the protective layer 3 positioned below the insulating layer 5 is removed to expose a part of the upper surface of the waveguide layer 2. The laminated body of the buffer layer 4 and protective layer 3 may be removed partially, not completely, from the electrode isolation region 6i. Further, both the buffer layer 4 and protective layer 3 need not be removed, and only the buffer layer 4 may be removed together with the insulating layer 5 to expose a part of the upper surface of the protective layer 3.

In order for the optical modulator to obtain good high-frequency characteristics, the following three factors are important: (1) speed matching; (2) low electrode loss; and (3) impedance matching. The speed matching of (1) refers to matching between the speed of light and the speed of a traveling-wave electrode, and there is a need to match the effective refractive indices between them. The effective refractive index of light is substantially determined by a material used for the optical waveguide and is not adjustable. On the other hand, the effective refractive index of the traveling-wave electrode can be reduced by removing the parts of the protective layer 3, buffer layer 4, and insulating layer 5 as illustrated in FIGS. 4A and 4B, that is, adjustable. Further, the effective refractive index can be increased by adding another layer. However, impedance may be changed with a change in the effective refractive index, so that, actually, it is necessary to optimize a condition satisfying both the (1) speed matching and (3) impedance matching.

As described above, in the optical modulator 300 according to the third embodiment, a part of the insulating layer 5 existing below the electrode isolation region 6i between the lower part 7b of the signal electrode 7 and the lower part 8b of the first ground electrode 8 is removed, so that it is possible to match the effective refractive index of the traveling-wave electrode and the effective refractive index of light to achieve good speed matching. Further, in the optical modulator 400 according to the fourth embodiment, a part of the insulating layer 5 and a part of a laminated body constituted of the buffer layer 4 and protective layer 3 (or a part of a laminated body constituted of the insulating layer 5 and buffer layer 4) existing below the electrode isolation region 6i between the lower part 7b of the signal electrode 7 and the lower part 8b of the first ground electrode 8 are removed, so that it is possible to match the effective refractive index of the traveling-wave electrode and the effective refractive index of light to thereby achieve good speed matching.

Although the Mach-Zehnder optical waveguide 10 is linearly formed in the optical modulator 100 according to the first embodiment illustrated in FIG. 1, it may have a curved section.

Figure 5A:
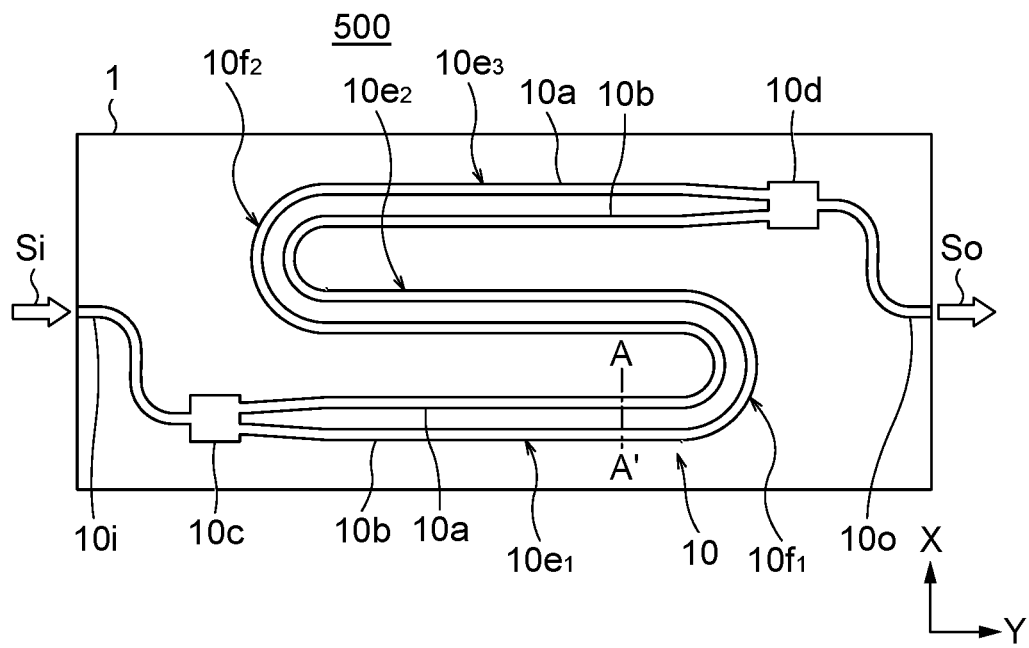
FIGS. 5A and 5B are plan views of an optical modulator 500 according to a fifth embodiment of the present invention.
Figure 5B:
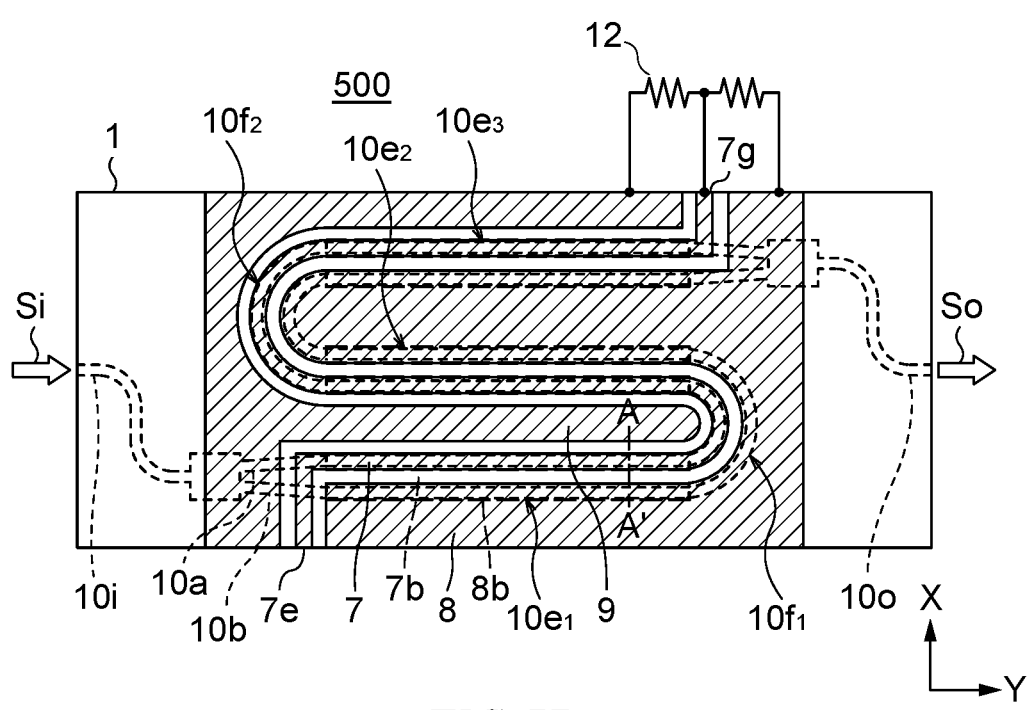

FIGS. 5A and 5B are plan views of an optical modulator 500 according to a fifth embodiment of the present invention. FIG. 5A illustrates only the optical waveguide, and FIG. 5B illustrates the entire configuration of the optical modulator 500 including the traveling-wave electrode.

As illustrated in FIGS. 5A and 5B, the optical modulator 500 according to the present embodiment is featured in that the Mach-Zehnder optical waveguide 10 is constructed by a combination of linear sections and curved sections. Specifically, the Mach-Zehnder optical waveguide 10 has first to third linear sections $10e_1$, $10e_2$, and $10e_3$ arranged parallel to one another, a first curved section $10f_1$ connecting the first and second linear sections $10e_1$ and $10e_2$, and a second curved section $10f_2$ connecting the second and third linear sections $10e_2$ and $10e_3$.

In the optical modulator 500 according to the present embodiment, the cross-sectional structures of the respective linear sections $10e_1$, $10e_2$, and $10e_3$ of the Mach-Zehnder optical waveguide 10 taken along line A-A' in FIGS. 5A and 5B are each formed into that illustrated in FIG. 2, FIG. 3, FIG. 4A, or FIG. 4B. That is, the first lower surface $S_{11}$ of the signal electrode 7 covers the first optical waveguide $10a$ at the first to third linear sections $10e_1$, $10e_2$, and $10e_3$ through the buffer layer 4, and the first lower surface $S_{21}$ of the first ground electrode 8 covers the second optical waveguide $10b$ at the first to third linear sections $10e_1$, $10e_2$, and $10e_3$ through the buffer layer 4. The first lower surface $S_{11}$ of the signal electrode 7 and the first lower surface $S_{21}$ of the first ground electrode 8 each preferably cover all the first to third linear sections $10e_1$, $10e_2$, and $10e_3$, but may each cover only, e.g., the first linear section $10e_1$.

In the present embodiment, the input light Si is input to one end of the first linear section $10e_1$, travels from the one end of the first linear section $10e_1$ toward the other end thereof, makes a U-turn at the first curved section $10f_1$, travels from one end of the second linear section $10e_2$ toward the other end thereof in the direction opposite to that in the first linear section $10e_1$, makes a U-turn at the second curved section $10f_2$, and travels from one end of the third linear section $10e_3$ toward the other end thereof in the direction same as that in the first linear section $10e_1$.

The optical modulator has a problem of a long element length. However, by folding the optical waveguide as illustrated, the element length can be significantly reduced, obtaining a remarkable effect. Particularly, the optical waveguide formed of the lithium niobate film is featured in that it has small loss even when the curvature radius thereof is reduced up to about 50 μm and is thus suitable for the present embodiment.

It is apparent that the present invention is not limited to the above embodiments, but may be modified and changed without departing from the scope and spirit of the invention.

For example, in the above embodiments, the optical modulator has the pair of optical waveguides $10a$ and $10b$ each formed of the lithium niobate film epitaxial grown on the substrate 1; however, the present invention is not limited to such a configuration, and the optical waveguides may be formed by Ti diffusion in the vicinity of the surface of a lithium niobate single-crystal substrate. However, the optical waveguide formed of the lithium niobate film can be reduced in width, so that a problem of the electric field concentration is conspicuous, and the present invention is more effective. Further, as the waveguide layer 2, a semiconductor material, a polymer material, or the like having electrooptic effect may be used.

Further, although the lower surfaces of the respective first ground electrode 8 and signal electrode 7 each have a two-step structure in the present invention, they may have a step structure of three or more steps. In this case, a surface contacting the buffer layer 4 is the first lower surface, and surfaces that do not contact the buffer layer 4 are all the second lower surfaces. Further, the lower part $7b$ of the signal electrode 7 and the lower part $8b$ of the first ground electrode 8 may have a tapered shape in which the widths thereof are gradually reduced toward the first and second optical waveguides $10a$ and $10b$, respectively.

Further, although the second ground electrode 9 does not have the step structure in the above embodiment, it may have the step structure, or a part of the second ground electrode 9 may be embedded in the opening formed in the insulating layer 5.

Examples

Simulation was performed to calculate the wavelength chirp α of the modulated light of the optical modulator when the thickness T of the lower part $8b$ of the first ground electrode 8 (i.e., thickness of the insulating layer 5) was set as a variable parameter. The thickness of the waveguide layer 2 made of the lithium niobate film including the ridge $2r$ (i.e., total thickness of the waveguide layer 2 and the protective layer 3) was 1.5 μm, the ridge width ($W_0$) was 1 μm, the thickness of the buffer layer 4 was 0.9 μm, and the dielectric constant of the buffer layer 4 was 13. The electrode layer 6 including the signal electrode 7 and first and second ground electrodes 8 and 9 was made of Au, and the maximum thickness thereof was 11 μm. The width $W_{10}$ of the upper part $7a$ of the signal electrode 7 and the width $W_{11}$ of the lower part $7b$ were both 3 μm.

The thickness T of the lower part $8b$ of the first ground electrode 8 (i.e., thickness of the insulating layer 5) as the variable parameter was set to eight values: 0 μm (no step), 0.5 μm, 1 μm, 2 μm, 3 μm, 4 μm, 5 μm, and 6 μm. The width $W_{21}$ of the lower part $8b$ of the first ground electrode 8 was 3 μm (step height T #0). The gap $G_2$ between the signal electrode 7 and the first ground electrode 8 was 7 μm, and gap $G_3$ between the signal electrode 7 and the second ground electrode 9 was 12.5 μm.

Figure 6A:
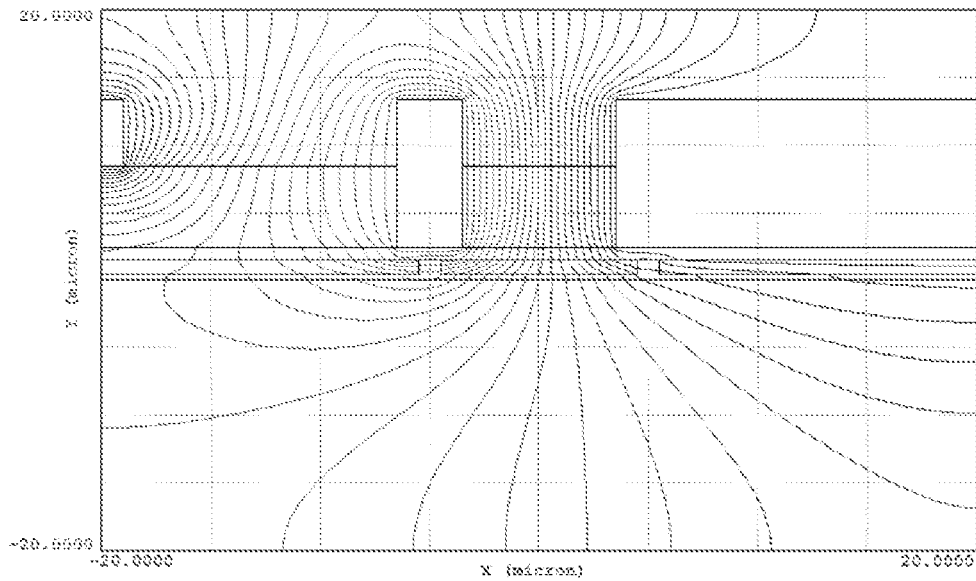
Figure 6B:
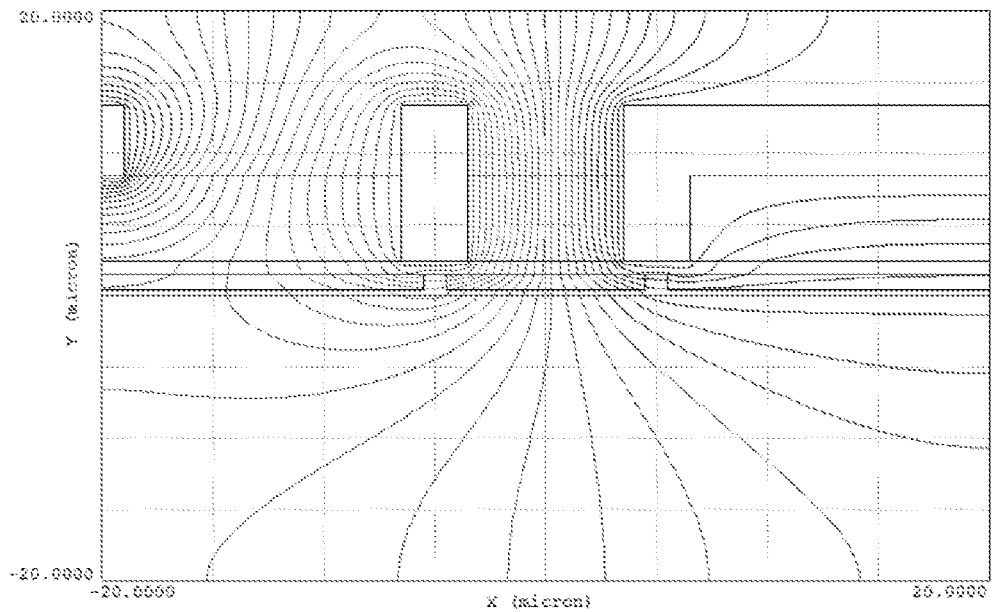

FIGS. 6A and 6B each illustrate an equipotential surface which is an example of a result obtained by the simulations. FIG. 6A illustrates a result when T is set to 0 μm, and FIG. 6B illustrates a result when T is set to 6 μm. The interval between the equipotential lines around the second optical waveguide $10b$ is smaller when T=6 μm, revealing that an electric field is stronger there.

Figure 7:
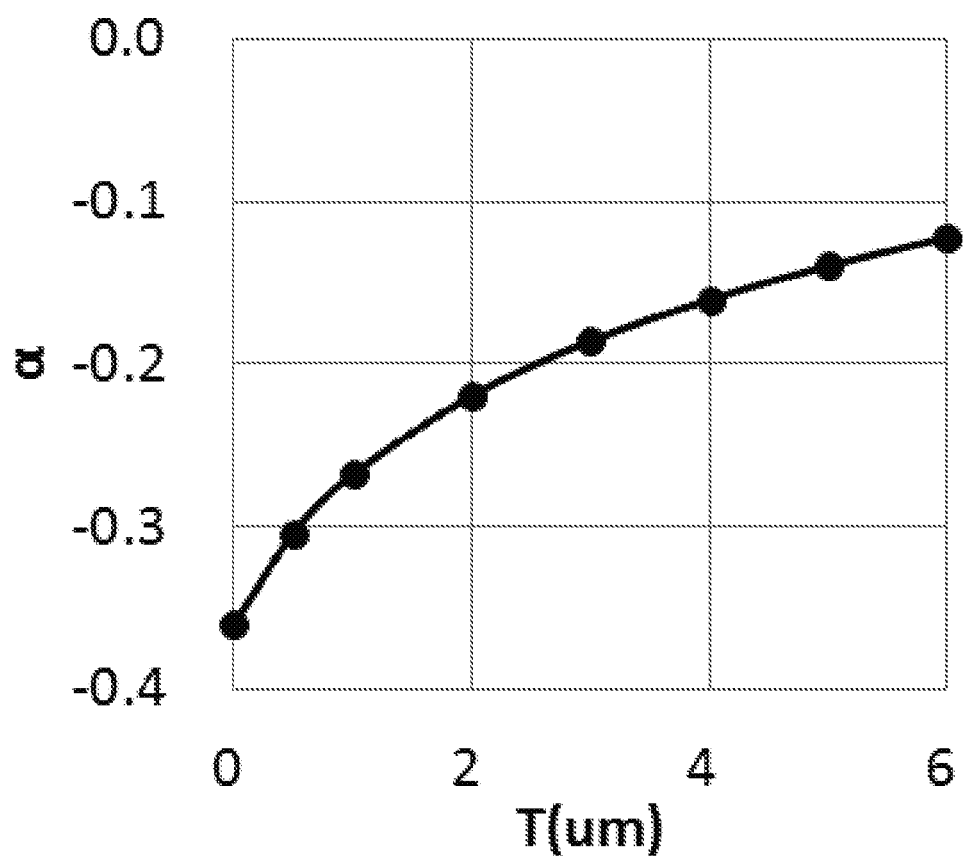
FIG. 7 is a graph illustrating a calculation result of the wavelength chirp α.
Figure 9A:
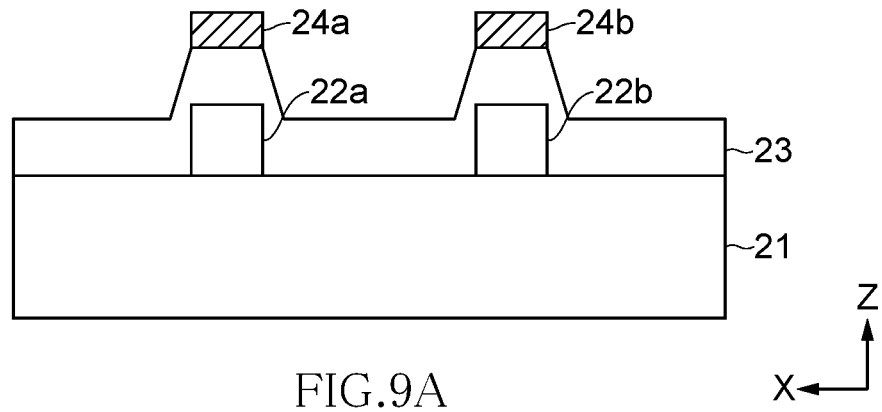
FIGS. 9A to 9C are schematic cross-sectional views illustrating the structure of conventional optical modulators.
Figure 9B:
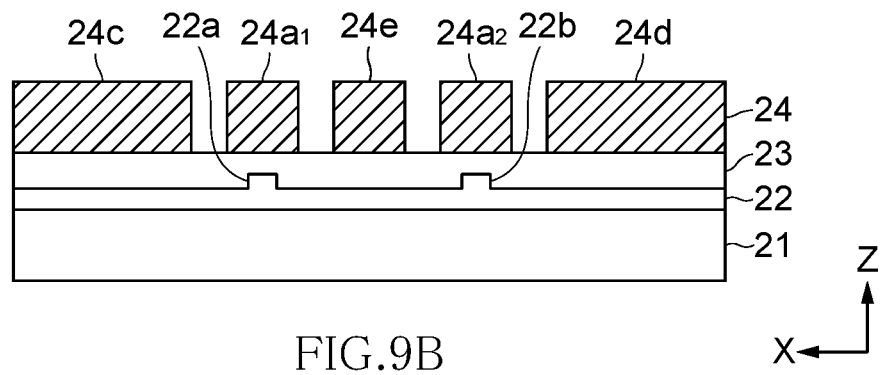
Figure 9C:
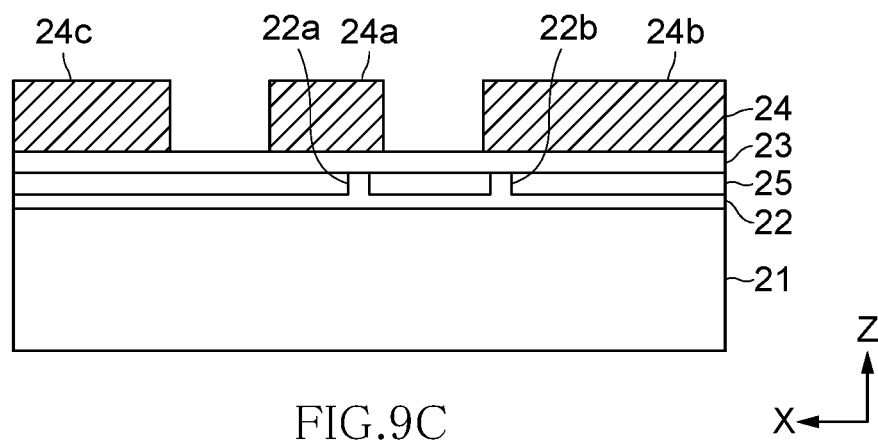

FIG. 7 is a graph illustrating a calculation result of the wavelength chirp α. As illustrated in FIG. 7, in the case of a conventional structure (see FIG. 9C) where no step is formed (T=0 μm), the absolute value of the wavelength chirp α is as large as 0.36. When T is larger than 0 μm, that is, when the first ground electrode 8 has two lower surfaces having different heights, and the lowest surface is in contact with the upper surface of the buffer layer 4, the absolute value of the wavelength chirp α can be reduced. This is mainly because an electric field to be applied to the right-side second optical waveguide $10b$ becomes large by increasing the step height T.

Then, simulation was performed to calculate the wavelength chirp α of the modulated light of the optical modulator when the width $W_{11}$ of the lower part $7b$ of the signal electrode 7 (i.e., width of the first lower surface $S_{11}$) was changed. The thickness T of the insulating layer 5 was 2 μm, and the thickness of the electrode layer 6 was 4 μm. The width $W_{21}$ of the lower part $8b$ of the first ground electrode 8 was 3 μm. The width $W_{11}$ of the lower part $7b$ of the signal electrode 7 as the variable parameter was set to four values:

3 µm, 4 µm, 5 µm, and 6 µm. The width $W_{10}$ of the upper part 7a of the signal electrode 7 was 15 µm.

Figure 8:
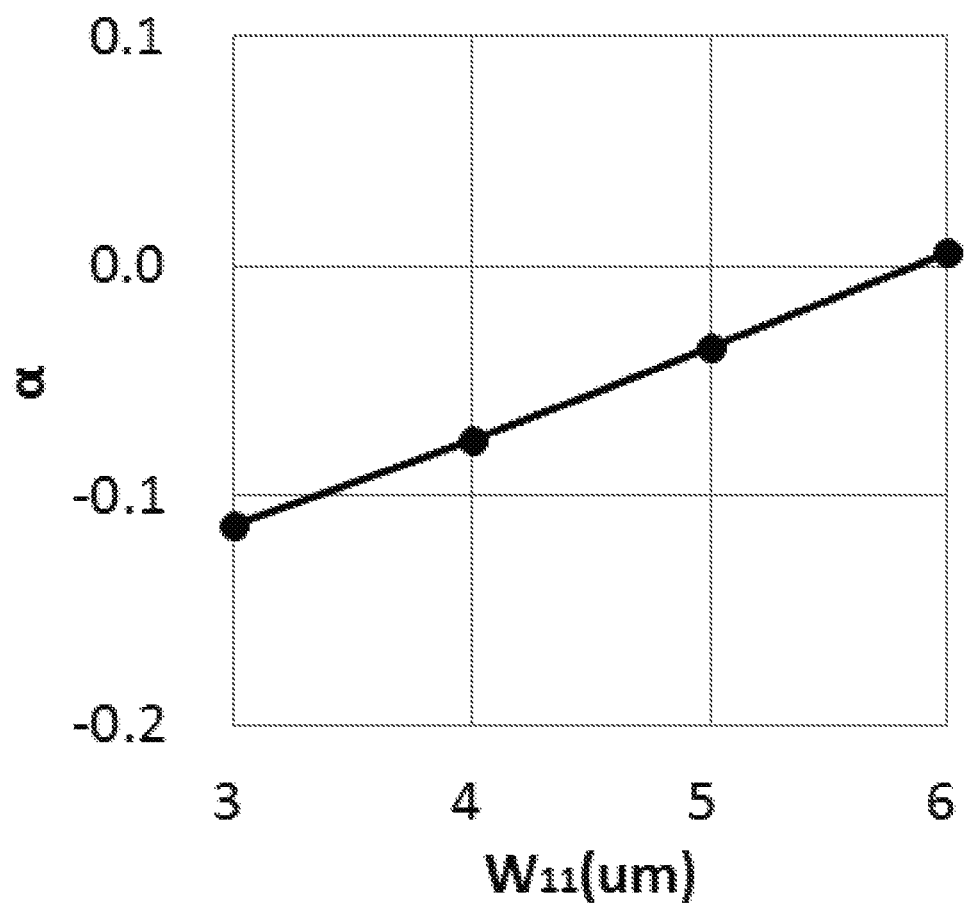
FIG. 8 is a graph illustrating a calculation result of the wavelength chirp α.

FIG. 8 is a graph illustrating a calculation result of the wavelength chirp α. As illustrated in FIG. 8, when the width $W_{11}$ of the lower part 7b of the signal electrode 7 is changed, the wavelength chirp α is linearly changed and becomes 0 when the width $W_{11}$ is about 6 µm. Since the width $W_{21}$ of the lower part 8b of the first ground electrode 8 is 3 µm, it can be seen that a condition for achieving chirp-free is that the width $W_{11}$ of the lower part 7b of the signal electrode 7 is larger than the width $W_{21}$ of the lower part 8b of the first ground electrode 8. As described above, the first and second lower surfaces $S_{11}$ and $S_{12}$ having different heights are formed in the signal electrode 7, and the width $W_{11}$ of the first lower surface $S_{11}$ of the signal electrode 7 in contact with the upper surface of the buffer layer 4 is controlled to finely adjust the magnitude of an electric field to be applied to the first optical waveguide 10a, whereby the wavelength chirp α can be reduced to substantially 0.

Then, simulation was performed to calculate the wavelength chirp α of the modulated light of the optical modulator shown in FIG. 4A in which a part of the insulating layer 5 existing below the electrode isolation region 6i between the signal electrode 7 and the first ground electrode 8 had been removed. The thickness of the waveguide layer 2 made of the lithium niobate film including the ridge 2r (i.e., total thickness of the waveguide layer 2 and protective layer 3) was 1.5 µm, the ridge width ($W_0$) was 1.2 µm, the thickness of the buffer layer 4 was 0.9 µm, and the dielectric constant of the buffer layer 4 was 13. The electrode layer 6 including the signal electrode 7 and first and second ground electrodes 8 and 9 was made of Au. The thickness of each of the upper part 7a of the signal electrode 7 and the upper part 8a of the first ground electrode 8 (i.e., thickness of the electrode layer 6) was 4 µm. The thickness T of each of the lower part 7b of the signal electrode 7 and the lower part 8b of the first ground electrode 8 (i.e., thickness of the insulating layer 5) was 3 µm.

The width $W_{10}$ of the upper part 7a of the signal electrode 7 was 34 mm, and the width $W_{11}$ of the lower part 7b was 4 µm. The width $W_{20}$ of the upper part 8a of the first ground electrode 8 was 203 µm, and the width $W_{21}$ of the lower part 8b was 3 µm. The width $W_{30}$ of the second ground electrode was 200 µm. The gap $G_2$ between the signal electrode 7 and the first ground electrode 8 was 8.5 µm, and gap $G_3$ between the signal electrode 7 and the second ground electrode 9 was 60 µm.

As a result of the simulations under the above conditions, the half-wavelength voltage of 2.5 V at 32 GHz, a bandwidth of 45 GHz, and a wavelength chirp α of 0.02 were obtained in an interaction length of 25 mm. Thus, a reduced wavelength chirp, a low drive voltage, and good frequency characteristics were obtained.

REFERENCE SIGNS LIST 1 substrate
2 waveguide layer
3 protective layer
4 buffer layer
5 insulating layer
6 electrode layer
7 signal electrode
7a upper part of the signal electrode
7b lower part of the signal electrode
7e one end of the signal electrode
7g other end of the signal electrode
8 first ground electrode
8a upper part of the first ground electrode
8b lower part of the first ground electrode
9 second ground electrode
10 Mach-Zehnder optical waveguide
10a first optical waveguide
10b second optical waveguide
10c branch section
10d multiplexing section
$10e_1$ first linear section of the Mach-Zehnder optical waveguide
$10e_2$ second linear section of the Mach-Zehnder optical waveguide
$10e_3$ third linear section of the Mach-Zehnder optical waveguide
$10f_1$ first curved section of the Mach-Zehnder optical waveguide
$10f_2$ second curved section of the Mach-Zehnder optical waveguide
12 terminal resistors
21 sapphire substrate
22a first optical waveguide
22b second optical waveguide
23 buffer layer
24a, $24a_1$, $24a_2$ signal electrode
24b, 24c 24d ground electrode
100, 200, 300, 400, 500, 600, 700, 800 optical modulator
$G_2$ gap between the signal electrode and the first ground electrode
$G_3$ gap between the signal electrode and the second ground electrode
$S_{11}$ first lower surface of the signal electrode (lower surface of the lower part 7b)
$S_{12}$ second lower surface of the signal electrode (upper surface of the lower part 7a)
$S_{21}$ lower surface of the first ground electrode (lower surface of the lower part 8b)
$S_{22}$ lower surface of the second ground electrode (lower surface of the upper part 8a)
Si input light
So modulated light (output light)
$W_0$ width of each of the first and second optical waveguides (ridge width)
$W_{10}$ entire width of the signal electrode
$W_{11}$ width of the first lower surface of the signal electrode
$W_{12}$ width of the second lower surface of the signal electrode
$W_{20}$ entire width of the first ground electrode
$W_{21}$ width of the first lower surface of the first ground electrode
$W_{22}$ width of the second lower surface of the first ground electrode
$W_{30}$ entire width of the second ground electrode

What is claimed is:

1. An optical modulator comprising:
a Mach-Zehnder optical waveguide including first and second optical waveguides;
a buffer layer covering the first and second optical waveguides; and
an electrode layer including first and second ground electrodes and a signal electrode positioned between the first and second ground electrodes in a plan view, wherein
an insulating layer provided between the buffer layer and the electrode layer, the insulating layer having first and second openings positioned above the first and second optical waveguides, respectively, the signal electrode has a first lower surface covering the first optical wave guide through the buffer layer, the signal electrode including an upper part formed in the electrode layer and a lower part embedded in the first opening, and the first ground electrode has a first lower surface covering the second optical waveguide through the buffer layer and a second lower surface positioned above the first lower surface thereof, the first ground electrode including an upper part formed in the electrode layer and a lower part embedded in the second opening, wherein a gap between the signal electrode and the second ground electrode is larger than a gap between the signal electrode and the first ground electrode, and wherein a width of the upper part of the first ground electrode is larger than a width of the lower part of the first ground electrode.

2. The optical modulator as claimed in claim 1, wherein a width of the first lower surface of the signal electrode is larger than a width of the first lower surface of the first ground electrode.

3. The optical modulator as claimed in claim 1, wherein the signal electrode further has a second lower surface positioned above the first lower surface thereof.

4. The optical modulator as claimed in claim 1, wherein the width of the first lower surface of the signal electrode and the width of the first lower surface of the first ground electrode are larger than the widths of the first and second optical waveguides.

5. The optical modulator as claimed in claim 1, wherein at least a part of the insulating layer existing at the lower portion of an electrode isolation region between the lower part of the signal electrode and the lower part of the first ground electrode is removed.

6. The optical modulator as claimed in claim 1, wherein the Mach-Zehnder optical waveguide has at least one linear section and at least one curved section, the first lower surface of the signal electrode covers the first optical waveguide at the linear section through the buffer layer, and the first lower surface of the first ground electrode covers the second optical waveguide at the linear section through the buffer layer.

7. The optical modulator as claimed in claim 1, wherein the Mach-Zehnder optical waveguide is formed of a lithium niobate film formed on a substrate, and the c-axis of the lithium niobate film is oriented in a direction perpendicular to a main surface of the substrate.

* * * * *